US011654375B2

(12) United States Patent
Smith

(10) Patent No.: US 11,654,375 B2
(45) Date of Patent: May 23, 2023

(54) SYSTEMS AND METHODS FOR DETECTING SPECULAR SURFACES

(71) Applicant: Universal City Studios LLC, Universal City, CA (US)

(72) Inventor: John David Smith, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 316 days.

(21) Appl. No.: 16/555,897

(22) Filed: Aug. 29, 2019

(65) Prior Publication Data

US 2021/0041370 A1 Feb. 11, 2021

Related U.S. Application Data

(60) Provisional application No. 62/883,995, filed on Aug. 7, 2019.

(51) Int. Cl.
*A63G 31/00* (2006.01)
*G01N 21/88* (2006.01)
(Continued)

(52) U.S. Cl.
CPC .............. *A63G 31/00* (2013.01); *G01B 11/24* (2013.01); *G01N 21/8806* (2013.01);
(Continued)

(58) Field of Classification Search
CPC .... G01N 21/8806; G01N 21/55; G01B 11/24; H04N 5/33; A23L 3/40; A23L 31/00;
(Continued)

(56) References Cited

U.S. PATENT DOCUMENTS 5,414,517 A 5/1995 Furuhashi
6,665,079 B1 12/2003 Tocci et al.
(Continued)

FOREIGN PATENT DOCUMENTS

| CN | 108226953 A | 6/2018 |
|---|---|---|
| EP | 2887105 A1 | 6/2015 |
| JP | 60154144 A | 8/1985 |

OTHER PUBLICATIONS

"Cylindrical M18 Sensors." Baumer, accessed Jun. 3, 2019, www.baumer.com/us/en/product-overview/object-detection/photoelectric-sensors/m18/c/13515/products.
(Continued)

*Primary Examiner* — Deoram Persaud
(74) *Attorney, Agent, or Firm* — Fletcher Yoder, P.C.

(57) ABSTRACT

A system for detecting specular surfaces, the system including an image sensor that captures image data from an area, a first light emitter that emits a first light into the area from a first position, a second light emitter that emits a second light into the area from a second position, and control circuitry. The control circuitry operates to acquire first image data from the image sensor while the first light emitter is active and the second light emitter is inactive, acquire second image data from the image sensor while the second light emitter is active and the first light emitter is inactive, and process the first image data with the second image data to identify non-overlapping image data between the first image data and the second image data as a specular surface.

20 Claims, 3 Drawing Sheets

(51) Int. Cl.
*G06V 10/141* (2022.01)
*H04N 5/33* (2023.01)
*G01B 11/24* (2006.01)
*G06V 10/56* (2022.01)
*G01N 21/55* (2014.01)
*G06V 10/10* (2022.01)

(52) U.S. Cl.
CPC ............ *G06V 10/141* (2022.01); *G06V 10/56* (2022.01); *G01N 21/55* (2013.01); *G06V 10/16* (2022.01); *H04N 5/33* (2013.01)

(58) Field of Classification Search
CPC ... A23L 5/11; A23L 5/13; A23P 20/18; A63G 31/00; A63J 5/00; G06V 10/141; G06V 10/16; G06V 10/56
See application file for complete search history.

(56) References Cited

U.S. PATENT DOCUMENTS

| | | | |
|---|---|---|---|
| 6,870,616 B2 | 3/2005 | Jung et al. | |
| 8,121,351 B2 | 2/2012 | Katz et al. | |
| 10,679,397 B1 | 6/2020 | Churchill et al. | |
| 2012/0229681 A1* | 9/2012 | Ansfield | H04N 5/2621 348/241 |
| 2014/0240513 A1* | 8/2014 | Funamoto | G01J 3/2803 348/164 |
| 2015/0253428 A1* | 9/2015 | Holz | G01S 17/36 356/5.01 |
| 2015/0336015 A1 | 11/2015 | Blum et al. | |
| 2018/0104600 A1 | 4/2018 | Stenzler | |
| 2018/0121746 A1* | 5/2018 | Irrgang | H04N 5/243 |
| 2019/0011556 A1* | 1/2019 | Pacala | G01S 7/4817 |

OTHER PUBLICATIONS

"Retroreflective Sensors." Pepperl+Fuchs, accessed Jun. 3, 2019, www.pepperl-fuchs.com/usa/en/classid_11 .htm? view=productgroupoverview.

Koch, R., et al. "Detection and Purging of Specular Reflective and TransparentObject Influences in 3D Range Measurements." ISPRS—international Archives of the Photogrammetry, Remote Sensing and Spatial Information Sciences, XLII-2/W3, 2017, pp. 377-384., doi:10.5194/isprs-archives-xlii-2-w3-377-2017.

Mosberger, Rafael, et al. "A Customized Vision System for Tracking Humans Wearing Reflective Safety Clothing from Industrial Vehicles and Machinery." PMC, Sep. 26, 2014, www.ncbi.nlm.nih.gov/pmc/articles/PMC4239879/.

Owen-Hill, Alex. "10 Solutions to Improve Robot Vision With Shiny Objects." Mar. 7, 2019, blog.robotiq.com/10-solutions-to-improve-robot-vision-with-shiny-objects.

Rosebrock, Adrian. "Detecting Multiple Bright Spots in an Image with Python and OpenCV." PyImageSearch, Oct. 31, 2016, www.pyimagesearch.com/2016/10/31/detecting-multiple-bright-spots-in-an-image-with-python-and-opencv/.

PCT/US2020/044789 International Search Report and Written Opinion dated Oct. 23, 2020.

* cited by examiner

SYSTEMS AND METHODS FOR DETECTING SPECULAR SURFACES

CROSS-REFERENCE TO RELATED APPLICATION

This application claims the benefit of U.S. Provisional Application No. 62/883,995, entitled "SYSTEMS AND METHODS FOR DETECTING SPECULAR SURFACES", filed on Aug. 7, 2019, which is hereby incorporated by reference in its entirety for all purposes.

BACKGROUND

Since the early twentieth century, amusement parks (or theme parks) have substantially grown in popularity. Accordingly, there has been an increased demand and an accompanying increase in competition with respect to amusement parks. It is therefore desirable to add more entertaining and interactive attractions to amusement parks. Engaging guests throughout their time at an amusement park is a major priority of amusement park entities. Even though large attractions, like rides and shows, tend to increase traffic at amusement parks, there exists a need to keep guests engaged, fascinated, and intrigued throughout their visit with other attractions that can make their experience all the more memorable. Thus, it is recognized that technology for improved interactions at amusement parks is desirable.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with an embodiment of the present disclosure, a system for detecting specular surfaces is provided. The system includes an image sensor configured to capture image data from an area, a first light emitter configured to emit a first light into the area from a first position, a second light emitter configured to emit a second light into the area from a second position, and control circuitry. The control circuitry is configured to acquire first image data from the image sensor while the first light emitter is active and the second light emitter is inactive. Further, the control circuitry is configured to acquire second image data from the image sensor while the second light emitter is active and the first light emitter is inactive. Further still, the control circuitry is configured to process the first image data with the second image data to identify non-overlapping image data between the first image data and the second image data as a specular surface.

In accordance with an embodiment of the present disclosure, a method for detecting specular surfaces is provided. The method includes capturing image data from an area with an image sensor, emitting a first light into the area from a first light emitter in a first position, emitting a second light into the area from a second light emitter in a second position, acquiring first image data from the image sensor while the first light emitter is active and the second light emitter is inactive, acquiring second image data from the image sensor while the second light emitter is active and the first light emitter is inactive, and processing the first image data with the second image data, using control circuitry, to identify non-overlapping image data between the first image data and the second image data as a specular surface.

In accordance with an embodiment of the present disclosure, a system for detecting specular surfaces and activating an animated figure is provided. The system includes an image sensor configured to capture image data from an area, a first light emitter configured to emit a first light into the area from a first position, a second light emitter configured to emit a second light into the area from a second position, and control circuitry. The control circuitry configured to acquire first image data from the image sensor while the first light emitter is active and the second light emitter is inactive. The control circuitry is also configured to acquire second image data from the image sensor while the second light emitter is active and the first light emitter is inactive. Further, the control circuitry is configured to process the first image data with the second image data to identify non-overlapping image data between the first image data and the second image data as a specular surface. The system is further configured to determine that non-overlapping image data between the first image data and the second image data corresponds to a specular surfaced based on comparison with a pre-determined threshold, and control an effect based on a location of the specular surface.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
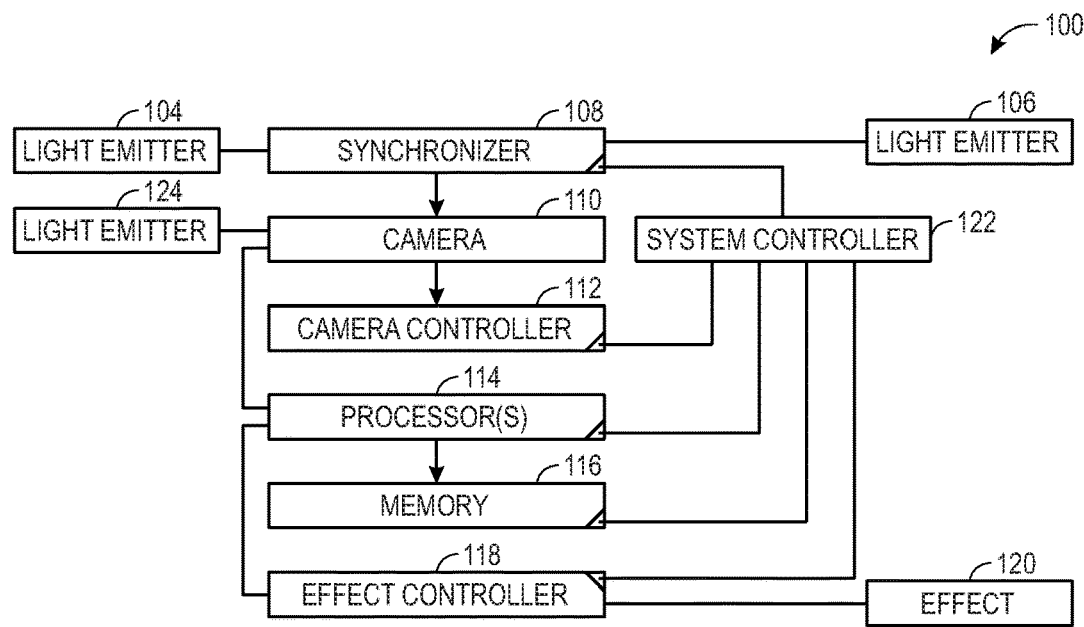
FIG. 1 is a schematic diagram of a specular surface detection system configured to be implemented to control an effect, in accordance with an embodiment of the present disclosure.

Embodiments of the present disclosure operate to detect specular or reflective surfaces (e.g., shiny objects) in an area and to cause a special effect (e.g., an animated figure) to respond to the detection of the specular surfaces. In one embodiment, light from different sources is emitted into a target area and imagery obtained of the target area is analyzed to provide location information for specular surfaces. Using such location information, special effects may be actuated in a manner that targets the location of the detected specular surfaces. For example, an animated figure may be actuated such that it gestures in the general direction of where the specular object (e.g., a shiny watch or coin) is identified as being located.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

In accordance with an embodiment, a system includes a camera, which is configured to detect infrared light, and two sources of infrared light, which are configured to emit flashes of infrared light into an area. The two sources of infrared light flashes may be positioned with enough distance between them such that a glint (light reflected with a high intensity, as occurs with light bouncing off of specular surfaces) observed on an object in a path of each emitted light will occupy different locations on the surface of the object. The lights are actuated (e.g., to turn on and off) in sync with a frame rate of the camera such that they alternate in emittance of light for a given camera frame (e.g., an image captured by the camera). In this way, images captured close in time by the camera will have a different arrangement of lighting sources. Moreover, these two light sources are positioned such that an object, in the path of the light emitted, upon receiving infrared light, may reflect glints of the light. The camera, having an ability to capture infrared light, is configured such that images of the area are captured in sync with each flash of infrared light that is emitted from each light source. The camera has an image sensor which operates to convert the light captured in each optical image to an electrical signal (e.g., a series of pixel color values that provide an image), and then sends consecutive image data (e.g., a series of images captured over time) to a processor. The processor identifies non-overlapping image data of the adjacent or consecutive images using image subtraction. After identifying the non-overlapping image data, the processor may also receive instructions from an algorithm that locates a position (e.g., a two-dimensional location) of the non-overlapping image data within an area observable by the camera. After identifying the position of the non-overlapping image data, the processor may also send the position as data to a special effects controller (e.g., an animated figure controller). The special effects controller may, for example, control a direction toward which an effect is directed. For example, an animated figure may be directed to perform a gesture toward the area where the specular surface was detected by the camera. Thus, in accordance with present embodiments, a specular surface detection system is designed to detect a relative positioning of a specular object by using glints of reflected light from a specular object to identify what may be considered a shiny object in a general or specific location. Further, in accordance with present embodiments, special effects may be activated based on the general or specific location information.

FIG. 1 is a schematic diagram of a specular surface detection system 100 that is implemented in order to provide an environment for guests to be entertained by interactive effects, such as animated figures at an amusement park. As illustrated, the specular surface detection system 100 includes a first light emitter 104, a second light emitter 106, a flash controller or synchronizer 108, a camera 110, a camera controller 112, a processor or processors 114 (e.g., a set of image processors), a memory 116, and an effect controller 118 operable to control an effect 120 based on a detected location of a specular surface. In the illustrated embodiment, the first light emitter 104 and the second light emitter 106 (the light emitters 104, 106) are configured to emit infrared light. However, in other embodiments, the light emitters 104, 106 may emit visible light and/or infrared light. Further, it should be noted that either of the illustrated light emitters 104, 106 may be representative of multiple emitters. For example, in one embodiment, the light emitter 104 may include an infrared light emitter used to facilitate provision of infrared glints (e.g., light intensely reflected from a shiny object) and an additional light emitter to bathe the environment with light (e.g., infrared or visible light) to offset noise that might be caused by varying light levels. In other embodiments, numerous light emitters in various positions may be employed.

In other embodiments, a separate light emitter or third light emitter 124 may be utilized to provide a base light level to offset noise that may be caused from shadows and the like. This third light emitter 124, which may be a ring light, may be attached about the axis of a lens of the camera 110 in order to help eliminate shadows that may be produced by the light emitters 104, 106. The third light emitter 124 may be constantly emitting infrared light while the light emitters 104, 106 are alternatingly flashing in sync with the frame rate of the camera 110. The third light emitter 124 may help produce a more uniformly illuminated image from the perspective of the camera 110 and may aid the specular surface detection system 100 in identifying specular surfaces by providing a more uniform background light.

The specular surface detection system 100, the synchronizer 108, the camera controller 112, and the effect controller 118 may each be separate devices or functional aspects of a single device, such as the system controller 122. Further, as in the illustrated embodiment, the system controller 122 may include the processor 114 and the memory 116 as well. Whether separate devices or aspects of a single device, these features and their respective functions will be discussed separately. The synchronizer 108 may synchronize alternation of the two light emitters 104 and 106 with the camera controller 112, such that in a given camera frame, light from one of the two light emitters 104, 106 is reflected and not light from the other of the two light emitters 104, 106. This may be done by alternatingly actuating power switches of the light emitters 104, 106 or otherwise controlling the light emitters 104, 106 to be alternatingly active and inactive, respectively. The camera controller 112 may control the frame rate of the camera 110 and this may be done based on instructions from the synchronizer 108. The camera controller 112 may be integrated with the camera 110 or part of a separate device. The effect controller 118 may receive location information and initiate an effect 120 based on the location information. For example, the effect controller 118 may contain circuitry or instructions stored on a computer-readable medium for controlling the effect 120 (e.g., a robot arm, a display screen, a light show, a firework) such that it is actuated in a particular manner based on the location information. The effect controller 118 may control a direction in which the effect 120 is actuated, a rate at which the effect is displayed, a type of activation of the effect 120, or the like.

The system controller 122 may include or control the synchronizer 108, the camera controller 112, the processor 114, the memory 116, and the effect controller 118. However, in other embodiments, one or more of these features may be separate components. The processor 114, which is representative of one or more processors, may contain circuitry equipped to perform image subtraction and/or other image comparison techniques. In one embodiment, the processor 114 operates based on instructions stored on the memory 116, which is representative of one or more tangible, non-transitory, computer-readable mediums configured to store instructions executable by processing circuitry, such as the processor 114. These instructions may include one or more algorithms or circuitry configured to perform image subtraction and/or image comparison techniques to identify specular surfaces. Specifically, the one or more algorithms may operate to subtract out overlapping imagery from images taken by the camera 110 in sequence to identify glints that do not overlap in the images due to different lighting arrangements for the two emitters 104, 106. As will be discussed in further detail below, the algorithms may perform a pixel-by-pixel comparison and eliminate pixels that are within a threshold color value from consideration to avoid including information where there are minor differences in color. This is because some variation in color (e.g., light level) will occur in certain locations even without a specular surface reflecting the different lights from the two emitters 104 and 106. It should be noted that a pixel, as set forth in the present disclosure, broadly includes information about visual aspects of a space within an image and may include but does not require a physical pixel of a physical screen.

Figure 2:
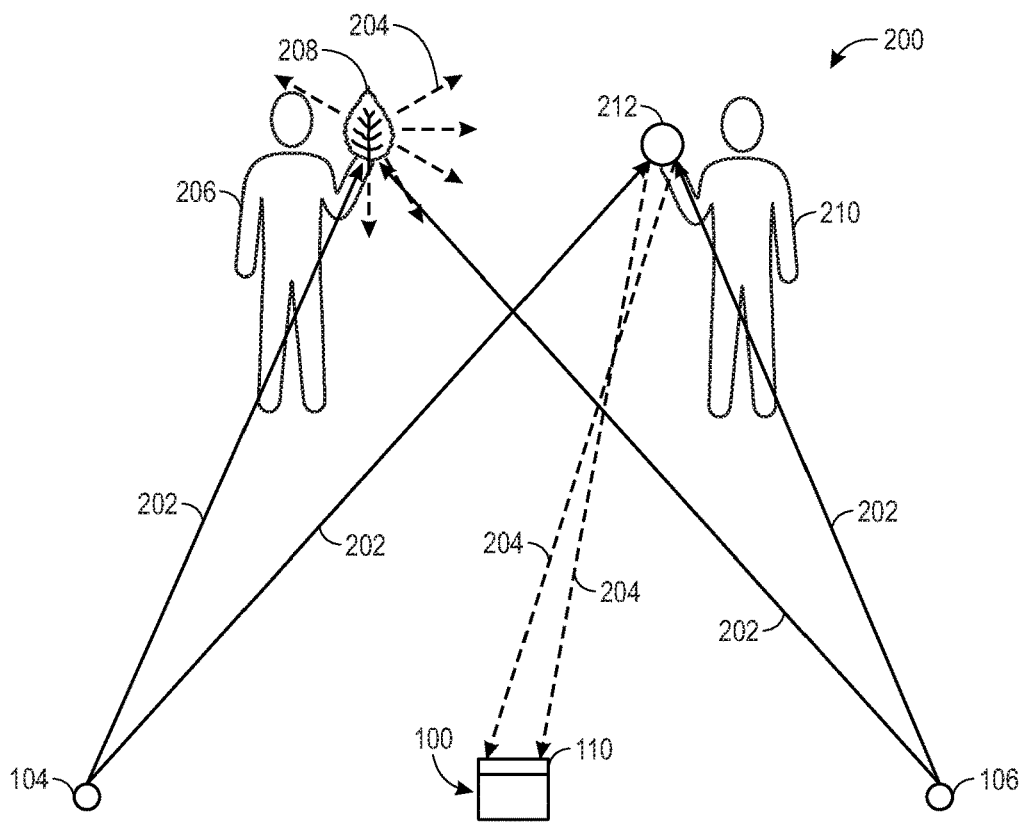
FIG. 2 is a schematic diagram of the specular surface detection system in operation, in accordance with an embodiment of the present disclosure.

FIG. 2 is a schematic diagram of the system 100 in operation, in accordance with an embodiment. Specifically, in the illustrated embodiment, the first light emitter 104 and the second light emitter 106 are projecting light into a space 200. To facilitate discussion, the light rays being emitted from the light emitters 104, 106 into the space 200 may be referred to as origination light 202. This origination light 202 is then redirected (e.g., reflected) from objects within the space 200. To facilitate discussion, the light rays being redirected may be referred to as redirected light 204. Some of the redirected light 204 is captured as image data by the camera 110. The origination light 202 is shown as solid lines and the reflected light 204 is shown as dashed lines. Specifically, in FIG. 2, a first user 206 is holding a leaf 208 and a second user 210 is holding a shiny coin 212. The leaf 208 is a non-specular object and the shiny coin 212 is a specular object.

Because the leaf 208 is non-specular, the origination light 202 hits the leaf 208 and is heavily dispersed as the redirected light 204. This is illustrated by the numerous beams of the redirected light 204 extending from the leaf 208. Because of this dispersion, images captured close together in time by the camera 110 do not substantially differ even though captured while different ones of the two light emitters 104, 106 are active. For example, because there is very little reflection of light (e.g., such that a glint is caused), there is a limited color difference in images acquired with different lighting provided by the light emitters 104, 106. Further, although some differences will likely be captured by the camera 110, pixels values (e.g., color or brightness values) in the images do not vary beyond a threshold because of this limited difference in redirected lighting. However, because the shiny coin 212 is a specular object, it creates different glares in images captured close in time depending on which of the two light emitters 104,106 is active (e.g., providing all or substantially all of the origination light 202). For example, the redirected light 204 from each of the light emitters 104, 106 is more heavily concentrated by the coin 212, as illustrated by the beams of the redirected light 204 illustrated as going to the camera 110 in FIG. 2. This is because of the specular nature of the shiny coin 212. This concentrated light (or glare) creates substantial lighting differences and different pixel values between images of the shiny coin 212 captured close together in time and with different lighting. These lighting differences, which are captured as image data, facilitate detection of the shiny coin 212 as a specular surface.

In the illustrated embodiment, the system 100 operates such that the light emitters 104, 106 are not emitting light in the same manner and at the same time. Light from only one of the light emitters 104, 106 is at least predominantly present in a given frame (an image capture frame). This may be referred to as asynchronous activation of the light emitters 104, 106, wherein one of the light emitters 104, 106 is active (e.g., on) and the other is inactive (e.g., off). This is achieved, in accordance with an embodiment, by controlling the light emitters 104, 106 such that only one is active (e.g., emitting a substantial amount of light) during a timeframe in which an image is being captured by the camera 110. This control may be performed by the camera controller 112, system controller 122, or the like. In operation, this may include one of the light emitters 104, 106 being off while the other is on. However, it may also include one of the light emitters 104, 106 being limited (e.g., providing an insubstantial amount of light) while the other is active (e.g. providing a substantial amount of light).

The camera 110 captures images at a rate determined by its frame rate and sends the images to the image processor 114 via an electrical signal. The image processor 114 performs image subtraction upon consecutive images it receives. Image subtraction is a process by which the digital value of a pixel or a collection of pixels in one image is subtracted from the digital value of a pixel or a collection of pixels in another image. In present embodiments, image subtraction can be employed for tracking the motion of objects, viewing important data in an image more clearly, or the like. In particular, in accordance with the present disclosure, image subtraction is used to identify specular surfaces and, in some instances, track them. As mentioned above, instructions for the performing of image subtraction may be stored on the memory 116, which is representative of one or more tangible, non-transitory, computer-readable mediums configured to store instructions executable by processing circuitry, such as the processor 114, of an electronic device.

Figure 3:
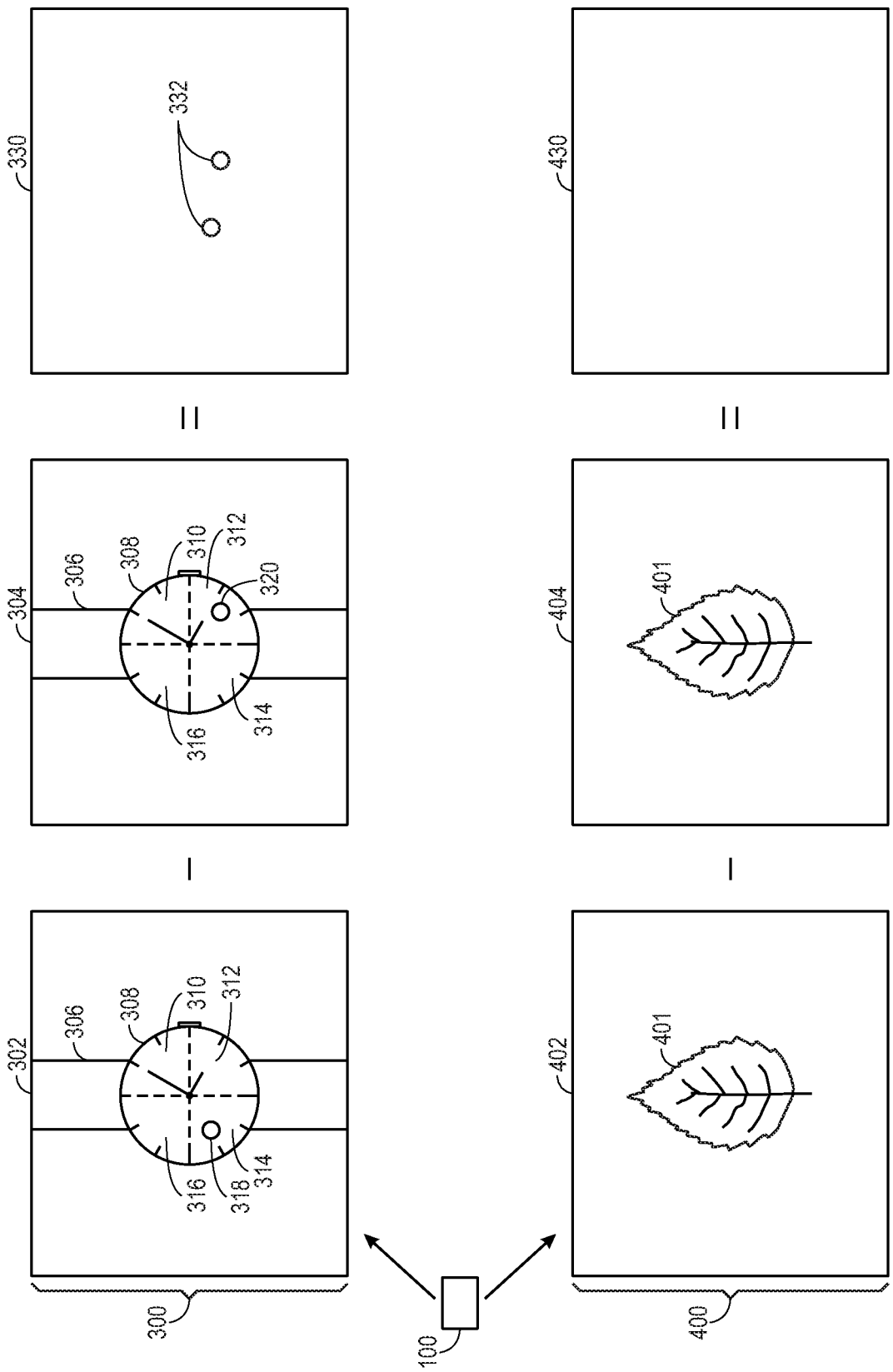
FIG. 3 is a schematic diagram of an image analysis process applied in identifying a specular surface, in accordance with an embodiment of the present disclosure.

FIG. 3 is a schematic diagram of a process of image subtraction in accordance with an embodiment of the present disclosure. Specifically, FIG. 3 includes a pictorial equation 300 that schematically represents a process for identifying specular surfaces by performing image subtraction to obtain a delta between an image 302 and an image 304 with the system 100, in accordance with present embodiments. The pictorial equation 300 shows the image 302 of a watch 306 that includes a face 308, wherein the face 308 is a specular surface. The face 308 of the watch 306 can be divided into quadrants: a first quadrant 310, a second quadrant 312, a third quadrant 314, and a fourth quadrant 316. In the image 302, a glint 318 is located in the third quadrant 314 of the watch's face 308. The image 302 was captured while the first light emitter 104 was on and the second light emitter 106 was off. The pictorial equation 300 also shows the image 304, which includes the same watch 306 with a glint 320 located in the second quadrant 312 of the watch's face 308. The image 304 was captured while the light emitter 106 was on and the light emitter 104 was off. The numerical value of each pixel in the image 304 is subtracted from the numerical value of the corresponding pixel in the image 302 in order to produce image 330. In other embodiments, the numerical value of each pixel in the image 302 may be subtracted from the numerical value of the corresponding pixel in the image 304 to produce the image 330. This may include determining the absolute difference between corresponding pixels in image 302 and 304 to produce image 330. Indeed, present embodiments include various techniques for obtaining a delta between color values of two or more such images (e.g., images 302 and 304). For example, this can also include obtaining deltas between corresponding groups of pixels that are treated together (e.g., as an average). As previously noted, a pixel may include image data assigned to a particular portion of an overall image captured by the camera 110 and does not require a physical pixel. Accordingly, obtaining the delta between pixels is essentially identifying a difference in values between data assigned to correlated spaces of an image.

As noted above, the image 330 is obtained by determining a delta between the images 302 and 304. The image 302 includes the glint 318, which is positioned differently than the glint 320 of the image 304. These are essentially bright spots that are differently positioned such that a delta between the image 302 and the image 304 emphasizes the glints 318, 320 in the image 330. In other words, except for the bright spots, the remaining portions of the two images 302 and 304 are essentially canceled out in the image 330. For example, corresponding portions of the images 302, 304 other than the glints 318, 320 are within threshold color or brightness values of each other such that, even though there may be minor differences in pixel values, the corresponding pixels are canceled out by the algorithm represented by the pictorial equation 300. Thus, the image 330 contains two bright spots 332 (e.g., groups of pixels with high brightness values) and these two bright spots 332 are the areas where the non-overlapping image data is observed. These two bright spots 332 are also where the glints 318 and 320 were originally observed to be in the images 302 and 304, respectively. The system 100 may be programmed or otherwise designed to correlate the presence of a collection of pixels with high numerical values (e.g. a high brightness value) in the resulting image 330 with an object having a shiny surface. Accordingly, the image 330 and the two bright spots 332 (which may overlap in certain embodiments) indicate to the system 100 that an object in the space 200 has a specular surface. In some embodiments, a distance between multiple bright spots, such as the two bright spots 332, may be read by the system 100 as multiple different specular surfaces. In an embodiment, the system 100 may employ an algorithm with threshold distances for determining that such bright spots correlate to multiple different specular surfaces.

The second pictorial equation 400 in FIG. 3 shows an example of a process of image subtraction applied to an image of an object that does not have a specular surface. Specifically, FIG. 3 includes a pictorial equation 400 that schematically represents a process for attempting to identify a specular surface on a non-specular object (i.e., a leaf 401) by performing image subtraction to obtain a delta between an image 402 and an image 404 with the system 100, in accordance with present embodiments. The image 402 is captured while the first light emitter 104 is on and second light emitter 106 is off. The image 404 is captured while the second light emitter 106 is on and the first light emitter 104 is off. As with pictorial equation 300, through image subtraction a delta is obtained based on differences between the numerical value of each pixel in image 402 and the numerical values of each pixel in image 404. A resulting image 430 displays a black or blank image which indicates that little to no infrared light was reflected off the leaf 401 in a way that would cause a glint, which would cause a delta based on differing light sources.

Minor differences may exist between the images 402 and 404 with respect to the corresponding pixel values even though the leaf 401 does not have a specular surface. For example, after some base level of image subtraction is performed on the images 402 and 404 of the same leaf 401 captured by the camera 110 at different times with different lighting, there may be slight differences in pixel values. However, these minor differences do not provide an indication of a specular surface because the system includes an algorithm for governing which pixel value differences correspond to a specular surface. To control whether the specular surface system 100 identifies a surface as specular through image subtraction or another image comparison technique, a mechanism for enforcing a threshold color or brightness value may be employed. For example, a threshold brightness for determining a specular surface may include a system for determining if the differences between corresponding pixels are high enough numbers for the system to observe the surface as specular. The instructions for determining if a pixel or collection of pixels exceed a threshold brightness for a single pixel or for a collection of pixels may be stored in the memory 116. Further, the memory 116 may store instructions or tables for assigning pixel values based on sensor data from the camera 110. A graphical user interface (GUI) may be attached to or a part of the system 100. The GUI may be configured to display image data that is stored in the memory 116. This graphical user interface may be attached to the system controller 122, another component of system 100, or it may be a separate device.

Figure 4:
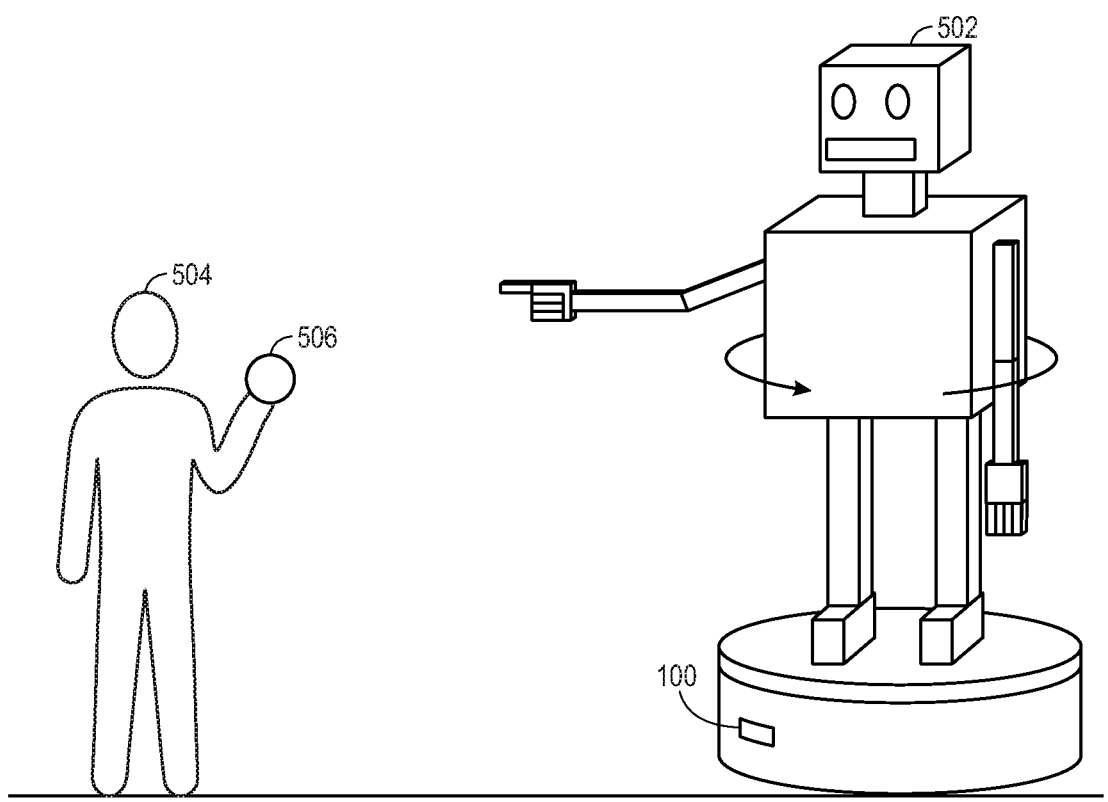
FIG. 4 is schematic diagram of a system including an animated figure performing a gesture in the direction of a detected specular surface, in accordance with an embodiment of the present disclosure.

When a specular surface is identified by specular surface detection system 100, the effect controller 118 may receive, from processor 114, a location of an identified specular surface. The location may be provided as location data that is within a frame of reference (e.g., a two-dimensional position in an image of the space 200) for the system 100. The effect controller 118 may command an effect 120 to perform based on the location. For example, the effect 120 may be an android that directs a gesture in a specific direction corresponding to the position of the specular surface, as determined using the processor 114. For example, FIG. 4 is an illustration of one type of effect that could be elicited by the system 100 in a direction based upon the location of the identified position of a specular surface. Specifically, FIG. 4 shows an animated FIG. 502 rotating toward a user 504 holding a shiny object 506 and then performing a kind gesture (e.g., pointing) in the general direction of where a specular surface of the shiny object 506 was identified.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for detecting specular surfaces, the system comprising:
   an area configured to facilitate guest activities;
   an image sensor configured to capture image data from the area, such that the image data includes an indication of a first guest holding or wearing a first object comprising a first specular surface and a second guest holding or wearing a second object comprising a second specular surface;
   a first light emitter configured to emit a first light into the area from a first position;
   a second light emitter configured to emit a second light into the area from a second position; and
   control circuitry configured to:
      acquire first image data from the image sensor while the first light emitter is active and the second light emitter is inactive;
      acquire second image data from the image sensor while the second light emitter is active and the first light emitter is inactive;
      process the first image data with the second image data to identify non-overlapping image data between the first image data and the second image data as the first specular surface being held or worn by the first guest and the second specular surface being held or worn by the second guest, wherein the non-overlapping image data comprises a first pair of bright spots within a first threshold distance of each other and a second pair of bright spots within a second threshold distance of each other;
      identify a first location of the first specular surface within the area and a second location of the second specular surface within the area based on the non-overlapping image data; and
      activate a movement of an animated figure based on the first location, the second location, or both.

2. The system of claim 1, comprising a third light emitter configured to provide a base level of light in the area.

3. The system of claim 1, wherein the image sensor comprises a camera configured to capture infrared light, and wherein the first light and the second light are infrared lights.

4. The system of claim 3, wherein the control circuitry is configured to alternately actuate the first light emitter and the second light emitter, in sync with a frame rate of the camera.

5. The system of claim 1, wherein the control circuitry is configured to process the first image data with the second image data by subtracting color values between the first image data and the second image data to identify the non-overlapping image data.

6. The system of claim 5, wherein subtracting the color values comprises negating values within a threshold range of each other on a pixel by pixel basis.

7. The system of claim 1, wherein the control circuitry comprises a processor and a memory storing instructions that, when processed by the processor, facilitate controlling or communicating with the image sensor.

8. The system of claim 1, wherein the movement comprises the animated figure gesturing towards the first location, the second location, or both.

9. The system of claim 8, wherein the control circuitry comprises a first control circuit integrated with the image sensor and a second control circuit integrated with the animated figure.

10. The system of claim 1, wherein the control circuitry is configured to identify the non-overlapping image data by:
    comparing pixel values of a portion of the first image data and pixel values of a corresponding portion of the second image data to determine whether the pixel values of the portion of the first image data and the pixel values of the corresponding portion of the second image data have a difference beyond a threshold; and
    in response to determining that the difference is beyond the threshold, identifying the portion of the first image data and the corresponding portion of the second image data as the non-overlapping image data.

11. The system of claim 1, wherein the control circuitry is configured to:
    process third image data with fourth image data to identify a blank image indicative of no specular surfaces within the area; and
    transmit a signal to cause the animated figure to become inactive or to not activate the movement of the animated figure.

12. The system of claim 11, wherein the control circuitry is configured to process the third image data and the fourth image data by:
    subtracting color values between the third image data and the fourth image data to determine whether pixel values of the third image data and pixel values of the fourth image data have a difference beyond a threshold value; and
    in response to determining that the difference is not beyond the threshold value, generating the blank image indicative of no specular surfaces within the area.

13. A method for detecting specular surfaces, the method comprising:
    capturing, with an image sensor, image data from an area, wherein the area includes a guest;
    emitting a first light into the area from a first light emitter that is located in a first position;
    emitting a second light into the area from a second light emitter that is located in a second position;
    acquiring first image data from the image sensor while the first light emitter is active and the second light emitter is inactive;
    acquiring second image data from the image sensor while the second light emitter is active and the first light emitter is inactive; and
    preventing, using control circuitry, generation of a special effect in response to processing the first image data with the second image data to identify a blank image, wherein the blank image does not comprise non-overlapping image data between the first image data and the second image data.

14. The method of claim 13, comprising:
    processing third image data with fourth image data to identify the non-overlapping image data between the third image data and the fourth image data as a specular surface that is held or worn by the guest.

15. The method of claim 14, wherein the third image data and the fourth image data each comprise at least one group of pixels, wherein each group of pixels of the at least one group of pixels has a color value corresponding to an average of color values of pixels therein, and wherein processing the third image data with the fourth image data to identify the non-overlapping image data comprises subtracting the color values between the third image data and the fourth image data to identify the non-overlapping image data.

16. The method of claim 14, comprising, identifying, based on the non-overlapping image data, a location of the specular surface that is held or worn by the guest.

17. The method of claim 16, comprising, activating the special effect based on the location of the specular surface, wherein the special effect comprises an animated figure gesturing towards the location of the specular surface that is held or worn by the guest.

18. A system for detecting specular surfaces and activating an animated figure, the system comprising:
an image sensor configured to capture image data from an area with an object comprising a specular surface that is held or worn by a guest;
a first light emitter configured to emit a first light into the area from a first position;
a second light emitter configured to emit a second light into the area from a second position; and
control circuitry configured to:
acquire first image data from the image sensor while the first light emitter is active and the second light emitter is inactive;
acquire second image data from the image sensor while the second light emitter is active and the first light emitter is inactive;
process the first image data with the second image data to identify non-overlapping image data between the first image data and the second image data;
determine that the non-overlapping image data corresponds to the specular surface based on a comparison with a pre-determined threshold; and
control an effect based on a location of the specular surface.

19. The system of claim 18, wherein the effect comprises activating the animated figure to perform a gesture toward the location.

20. The system of claim 18, wherein the control circuitry is configured to store the image data in a memory, and wherein the image data stored in the memory can be displayed on a graphical user interface.

* * * * *